(No Model.)
O. C. DAVIS.
HOLDBACK.
No. 473,569. Patented Apr. 26, 1892.
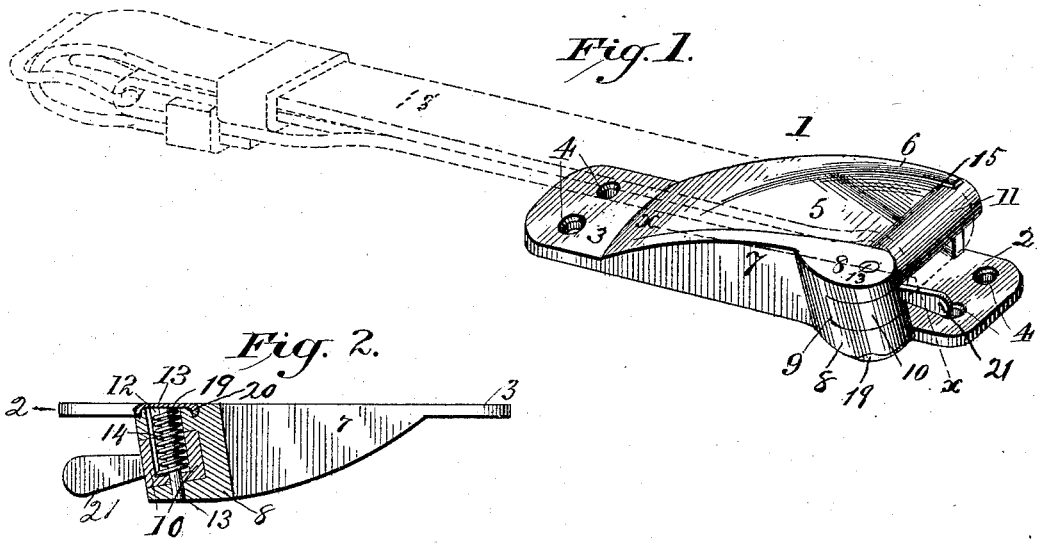
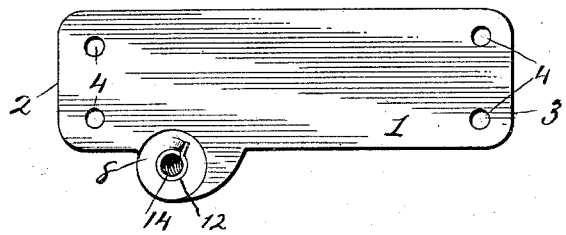
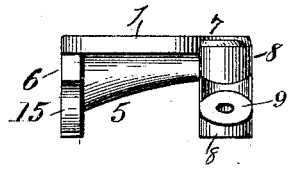
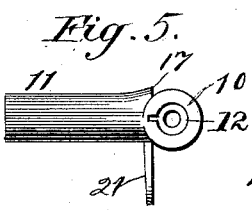
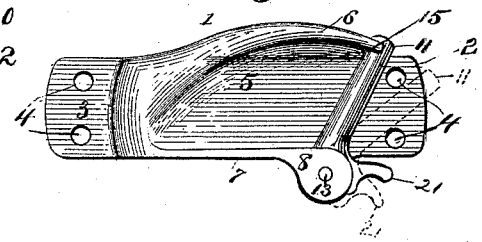
Witnesses:
Tom R. Stuart
Harry J. Davis
Inventor
Orin C. Davis.
By Marble, Mason & Canfield,
Attorneys.

UNITED STATES PATENT OFFICE.

ORIN C. DAVIS, OF MANISTEE, MICHIGAN, ASSIGNOR OF ONE-HALF TO THOMAS SMURTHWAITE, OF SAME PLACE.

HOLDBACK.

SPECIFICATION forming part of Letters Patent No. 473,569, dated April 26, 1892.

Application filed May 13, 1891. Serial No. 392,625. (No model.)

*To all whom it may concern:*

Be it known that I, ORIN C. DAVIS, a citizen of the United States, residing at Manistee, in the county of Manistee and State of Michigan, have invented certain new and useful Improvements in Holdbacks for Vehicles; and I do hereby declare the following to be a full, clear, and exact description of the invention, such as will enable others skilled in the art to which it appertains to make and use the same.

My invention relates generally to holdbacks for harness, and particularly to improvements therein which permit of their being secured and used upon either the under or upper sides of the thills of two-shaft vehicles, which are arranged and constructed in such manner as to enable the animals attached to said vehicles to hold them back and steady when descending hills and passing over rough surfaces, and which will also provide against undue wear of the harness, breakage of the shafts and vehicles, damage to the animals, and injury to the occupants of said vehicles; and it consists in the improved construction and arrangement or combination of parts and features hereinafter fully disclosed in the description, drawings, and claims.

The objects of my invention are, first, to provide improved holdbacks to which the breeching-straps of harness can be more readily or quickly and conveniently attached to and released from than any similar devices hitherto employed for this purpose, so far as I am aware; second, to provide holdbacks which can be applied to either the under or upper surfaces of shafts and which will insure perfect safety to the vehicles and their occupants in case of breakage of the harness or whiffletrees or of any accidental releasing of the tugs or traces or whiffletrees, as the animals will at once become entirely released from the thills or shafts and this without any effort on the part of the drivers, this result being due to the peculiar construction and operation of my new and improved holdbacks, and, third, to provide strong and durable holdbacks, which will be safer than those commonly employed, since by their use it will be impossible for the holdback-straps to draw vehicles forwardly, which will be quick and reliable in action, which will prevent wear and tear of the straps and breakage of the thills or shafts of the vehicles upon which they are employed, which will permit the breeching or holdback straps to always retain their loops, so that in hitching they can be easily and quickly slipped over the transverse draw-bars and in unhitching they need no attention whatever, since after the traces have been released the animals meet with no resistance whatever in passing out from between the shafts, which will permit the traces to be passed through and be supported by the holdback or breeching straps, so that when unhitched it is unnecessary to roll them up, as is now the general practice, and which will avoid the necessity of tying or wrapping the breeching-straps around the shafts. These objects are accomplished by the improved construction and arrangement or combination of parts and features illustrated in the accompanying drawings, forming part of this specification, in which the same reference-numerals indicate the same parts, and in which—

Figure 1 represents an inverted perspective view of the left one of my improved holdbacks, the breeching or holdback strap being shown in dotted lines; Fig. 2, a sectional view of said holdback in its proper or operative position, the section being taken on the dotted line $x\ x$ of Fig. 1; Fig. 3, a plan view of the upper or flat side thereof or of the part usually placed against the under side of the thill or shaft, the pivot-pin being removed; Fig. 4, a view of the front end of said holdback, the circular transverse bar being removed; Fig. 5, a top plan view of said transverse bar detached, and Fig. 6 a bottom plan view of said holdback.

Referring to the drawings, the numeral 1 indicates the one of my improved holdbacks which is to be secured to the left shaft of a vehicle and which is made of steel or other metal of suitable length and width, its size depending upon the dimensions of the thill or shaft upon which it is to be employed. The front and rear ends 2 and 3 thereof are made thinner than elsewhere, and each is formed with two countersunk openings 4, through which screws are passed for fastening it to the thill or shaft; also, it is curved or rounded at its ends. Along its central portion it is formed with the curved surface 5, which is inclined upwardly from the flange 6 to the flange 7, said flanges being forwardly and downwardly inclined from their rear to their front ends, as shown in Figs. 1 and 2. The flange 6 is short and thick, while the flange 7 is long and narrow and formed at its front end with the enlargement 8, which is provided with the downwardly and forwardly inclined and circular socket 9 for receiving the flattened and circular end 10 of the transverse bar 11 and with the vertical chamber 12, which is sufficiently large to receive the pivot-pin 13 and the spiral spring 14. The forward end of the short and thick flange 6 of the holdback is formed with the semicircular recess 15, within which is fitted the free end of the circular transverse bar 11 and which forms a support or shoulder for that end of said bar. The opposite or flattened and circular end 10 of this bar is closely fitted into the circular socket 9 and movably held therein upon the pivot-pin 13, which passes through the spiral spring 14 and the vertical chamber 12, the said spring being so arranged that it holds said bar tightly pressed against the support or shoulder formed by the semicircular recess 16 in the flange 6. Near the base of said bar is formed the shoulder 17, which abuts against the inner side of the long and narrow flange 7 and fits closely thereto, and which, in connection with the other or circularly-flattened end of the transverse bar 11, which fits closely within the semicircular recess 15, forms a brace or support which will resist any ordinary weight or pressure coming upon said bar. Under this construction and arrangement of the parts no weight or pressure from the breeching or holdback strap is communicated to either the spiral spring 14 or the pivot-pin 13, as the circular transverse bar 11 is wholly supported by its free end resting in the recess 15 and by its shoulder 17, near its other or pivoted end, abutting against the inner surface of the forward portion of the flange 7, the only function of said pivot-pin being to hold said transverse bar in place, while that of said spring is only to press and normally hold the free end of said bar within said recess 15.

The short and thick flange 6 of my improved holdback is projected somewhat farther toward its front end than that of the long and narrow flange 7, so that when the circular ball 11 is in place or operative position it will be somewhat angled or inclined forwardly, so as to permit of the ready or easy passage therefrom of the loop of the breeching or holdback strap 18. When in use or operation this holdback-strap will draw firmly upon said bar, which is arranged at about the same angle as the inclined curved surface 5 along the center of the holdback and at about the same angle as the holdback-strap leading from the breeching to the thill or shaft.

The pivot-pin 13 may be provided with the broad head 19, which fits into the circular groove 20, formed in the flat surface of the enlargement 8; also, said groove and head may be respectively made deeper and thicker at their outer edges than elsewhere, as shown in Fig. 2, so as to turn off or shed water and keep it from running in upon and rusting said pin and the spiral spring 14. However, said groove and broad head for the pivot-pin may be dispensed with, as it is only necessary that suitable provision be made for holding said pin firmly in place. The holdback-strap 18 is always looped, it being unnecessary to unbuckle the same after it has been once arranged for either hitching or unhitching the animal; also, the circular bar 11 is provided with the finger-piece 21 for moving its free end forwardly, after which the loop of said holdback-strap can be easily slipped over said bar and into operative position.

While it is practicable to use my improved holdbacks upon the upper sides of the thills or shafts of vehicles by reversing their positions or shifting the right one to the left shaft and the left one to the right shaft, yet it is preferable to attach them to the under sides of said shafts, so that the angle or inclination of the transverse bars will be such as to permit the straps leading backwardly therefrom to the breeching to bear firmly and fully upon said bars, otherwise the pull or draft would be along the edges of said straps and thus wear them out more quickly.

Having thus fully described the construction and arrangement or combination of the several parts and features of my invention, its advantages and operation, what I claim as new is—

1. A holdback provided along its sides with forwardly and downwardly curved flanges and with a pivoted transverse bar at the front ends of said flanges, substantially as described.

2. A holdback provided along its sides with forwardly and downwardly curved flanges and with a pivoted circular transverse bar at the front ends of said flanges, substantially as described.

3. A holdback provided along its sides with forwardly and downwardly curved flanges and with a pivoted circular spring-pressed, transverse bar at the front ends of said flanges, substantially as described.

4. A holdback provided along its sides with forwardly and downwardly curved flanges which are respectively short and thick and long and narrow and with a transverse bar at the front ends of said flanges, substantially as described.

5. A holdback formed along its central portion with an upwardly-inclined curved surface and provided along its sides with forwardly and downwardly curved flanges and with a pivoted transverse bar at the front ends thereof, substantially as described.

6. A holdback formed along its central portion with an upwardly-inclined curved surface and provided along its sides with forwardly and downwardly curved flanges and with a pivoted and spring-pressed transverse bar at the front ends thereof, substantially as described.

7. A holdback formed along its central portion with an upwardly-inclined curved surface and with rounded ends having countersunk openings and provided along its sides with forwardly and downwardly curved flanges and with a spring-pressed transverse bar at the front ends of said flanges, substantially as described.

8. A holdback formed along its central portion with an upwardly-inclined curved surface and provided along its sides with forwardly and downwardly curved flanges having, respectively, a semicircular recess and a circular socket in their front ends and with a transverse bar fitted into said recess and socket, substantially as described.

9. A holdback formed along its central portion with an upwardly-inclined curved surface and provided along its sides with forwardly and downwardly curved flanges having, respectively, a semicircular recess and a circular socket in their front ends and with a circular spring-pressed transverse bar fitting into said recess and socket, substantially as described.

10. A holdback formed along its central portion with an upwardly-inclined curved surface and provided along its sides with forwardly and downwardly curved flanges having, respectively, a semicircular recess and a downwardly and forwardly inclined and circular socket in their front ends and with a circular spring-pressed transverse bar fitting into said recess and socket, substantially as described.

11. A holdback formed along its central portion with an upwardly-inclined curved surface and provided along its sides with forwardly and downwardly curved flanges having, respectively, a semicircular recess and a downwardly and forwardly inclined and circular socket in their front ends, an enlargement having a vertical chamber and a pivot-pin fitting therein, and with a circular pivoted transverse bar fitting into said recess and socket, substantially as described.

12. A holdback formed along its central portion with an upwardly-inclined curved surface and provided along its sides with forwardly and downwardly curved flanges having, respectively, a semicircular recess and a downwardly and forwardly inclined and circular socket in their front ends, an enlargement having a vertical chamber and a pivot-pin fitting therein, and with a circular spring-pressed transverse bar fitting into said recess and socket, substantially as described.

13. A holdback formed along its central portion with an upwardly-inclined curved surface and provided along its sides with forwardly and downwardly curved flanges having, respectively, a semicircular recess and a downwardly and forwardly inclined and circular socket at their front ends, with an enlargement having a vertical chamber and a pivot-pin and spiral spring therein, and with a circular transverse bar having one end flattened and fitted at its two ends into said recess and socket, substantially as described.

14. A holdback provided along its sides with forwardly and downwardly curved flanges having, respectively, a semicircular recess and a circular socket in their front ends and with a pivoted transverse bar fitting into said recess and socket and having a shoulder near one of its ends, substantially as described.

15. A holdback provided along its sides with forwardly and downwardly curved flanges having, respectively, a semicircular recess and a circular socket in their front ends and with a pivoted and spring-pressed transverse bar fitting into said recess and socket and having a shoulder near one of its ends, substantially as described.

16. A holdback provided along its sides with forwardly and downwardly curved flanges having, respectively, a semicircular recess and a circular socket in their front ends and with a pivoted and spring-pressed transverse bar fitting into said recess and socket and having a shoulder near one of its ends and also a finger-piece, substantially as described.

17. A holdback provided along its sides with forwardly and downwardly curved flanges having, respectively, a semicircular recess and a circular socket in their front ends, with an enlargement having a vertical chamber and a pivot-pin and spiral spring fitting therein, and with a circular transverse bar having one end flattened and fitting at its two ends into said recess and socket and also having a finger-piece, substantially as described.

18. A holdback formed along its central portion with an upwardly-inclined curved surface and provided along its sides with forwardly and downwardly curved flanges having, respectively, a semicircular recess and a circular socket in their front ends, with an enlargement having a vertical chamber and a pivot-pin and spiral spring fitting therein, and with a circular transverse bar having one end flattened and fitting at its two ends into said recess and socket and also having a shoulder and a finger-piece near one end, substantially as described.

19. A holdback provided along its sides with forwardly and downwardly curved flanges which are respectively short and thick and long and narrow, the front end of the former being projected somewhat farther forward than that of the latter and with a transverse bar at the front ends of said flanges, substantially as described.

20. A holdback provided along its sides with forwardly and downwardly curved flanges which are respectively short and thick and long and narrow, the front end of the former being projected somewhat farther forward than that of the latter, and with a transverse and inclined bar at the front ends of said flanges, substantially as described.

21. A holdback provided along its sides with forwardly and downwardly curved flanges which are respectively short and thick and long and narrow, the front end of the former being projected somewhat farther forward than than of the latter, and with a transverse and spring-pressed bar at the front ends of said flanges, substantially as described.

22. A holdback provided along its sides with forwardly and downwardly curved flanges which are respectively short and thick and long and narrow, the front end of the former being projected somewhat farther forward than that of the latter, and with a transverse, inclined, and spring-pressed bar at the front ends of said flanges, substantially as described.

23. A holdback formed along its central portion with an upwardly-inclined curved surface and provided along its sides with forwardly and downwardly curved flanges which are respectively short and thick and long and narrow, the front end of the former being projected somewhat farther forward than that of the latter, and with a transverse bar at the front ends of said flanges, substantially as described.

24. A holdback formed along its central portion with an upwardly-inclined curved surface and provided along its sides with forwardly and downwardly curved flanges which are respectively short and thick and long and narrow, the front end of the former being projected somewhat farther forward than that of the latter, and with a transverse, inclined, and spring-pressed bar at the front ends of said flanges, substantially as described.

25. A holdback formed along its central portion with an upwardly-inclined curved surface and provided along its sides with forwardly and downwardly curved flanges having, respectively, a semicircular recess and a downwardly and forwardly inclined and circular socket at their front ends, with an enlargement having a vertical chamber and a pivot-pin and spiral spring therein, and with a pivoted and forwardly-inclined bar having one end flattened and fitted at its two ends into said recess and socket, substantially as described.

In testimony whereof I affix my signature in presence of two witnesses.

ORIN C. DAVIS.

Witnesses:
   THOS. SMURTHWAITE,
   S. A. CAHILL.